Oct. 6, 1953
M. A. SPURLIN
2,654,826
ANTIFREEZE HEATER
Filed Aug. 14, 1951
2 Sheets-Sheet 1
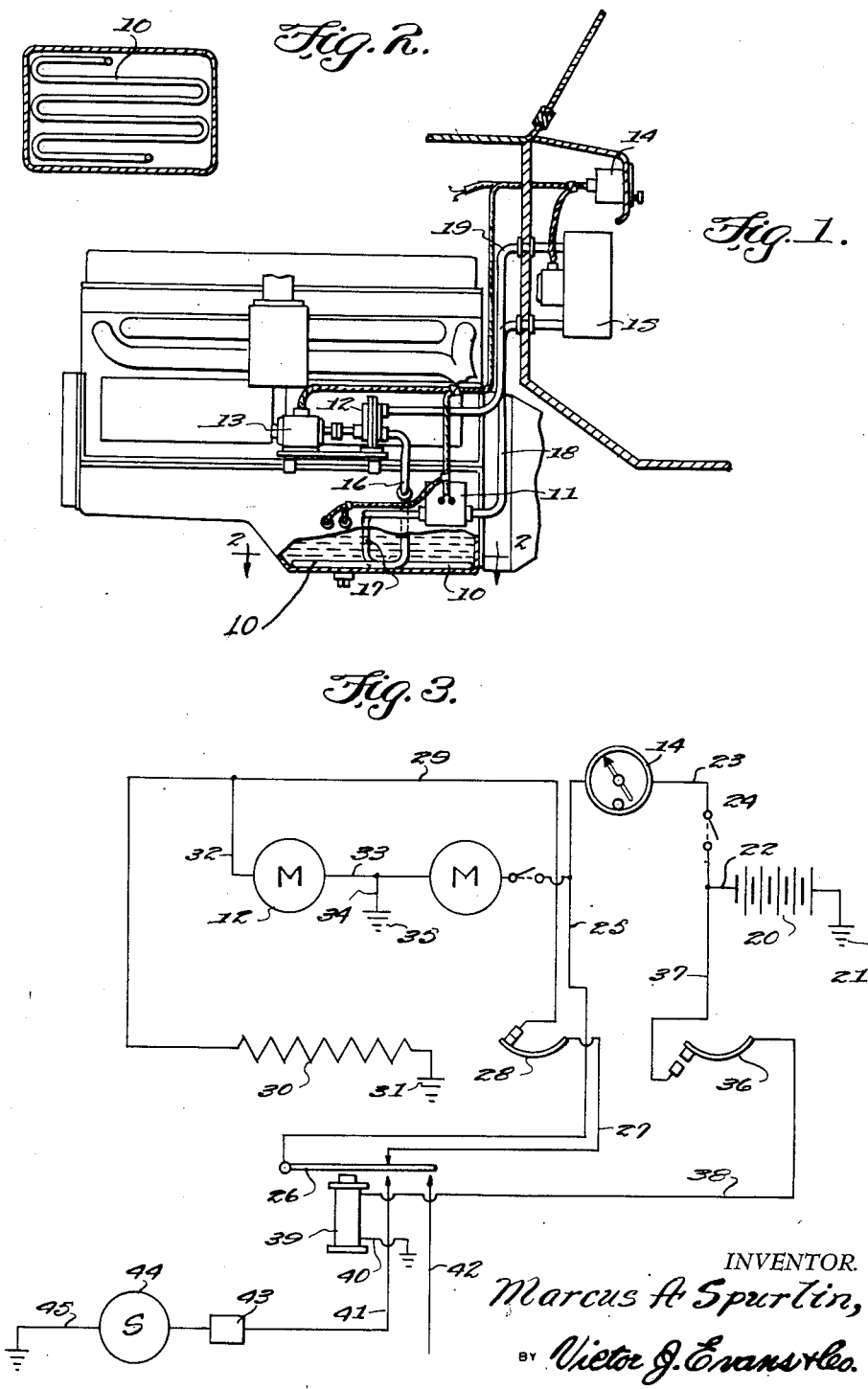
INVENTOR.
Marcus A Spurlin,
BY Victor J. Evans & Co.
ATTORNEYS Oct. 6, 1953        M. A. SPURLIN        2,654,826
ANTIFREEZE HEATER
Filed Aug. 14, 1951        2 Sheets-Sheet 2
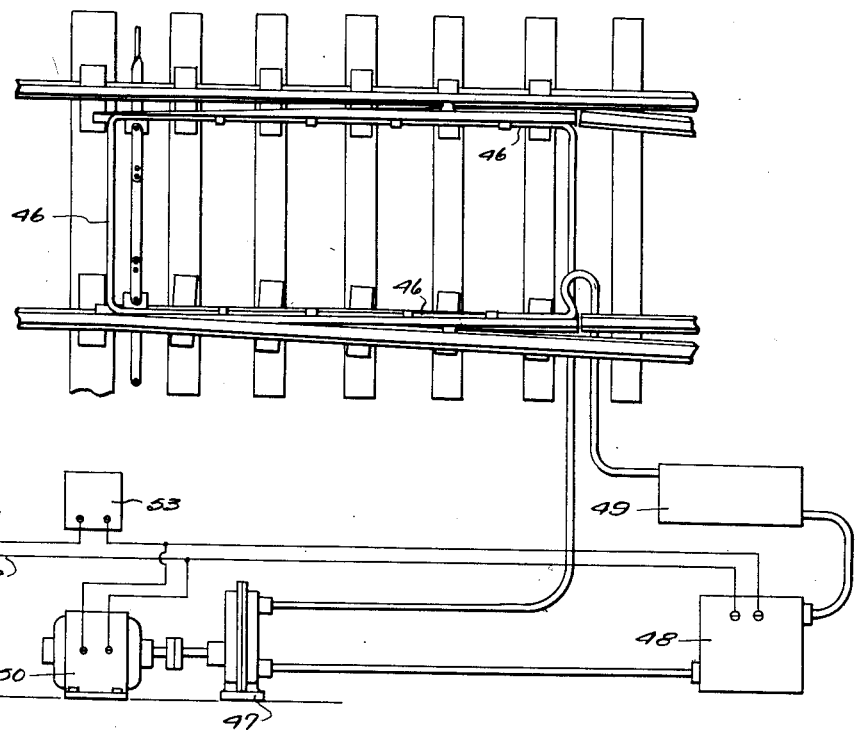
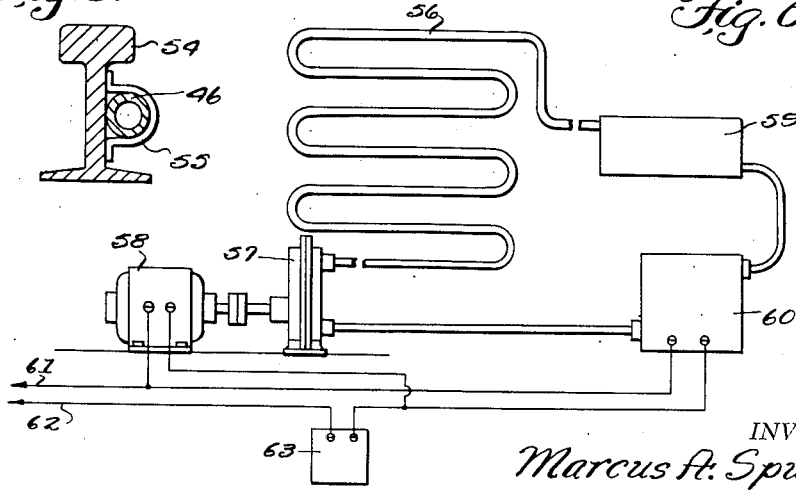
INVENTOR.
Marcus A. Spurlin,
BY Victor J. Evans & Co.
ATTORNEYS Patented Oct. 6, 1953

2,654,826

UNITED STATES PATENT OFFICE 2,654,826

ANTIFREEZE HEATER

Marcus A. Spurlin, San Francisco, Calif.

Application August 14, 1951, Serial No. 241,765

3 Claims. (Cl. 219—39)

1

This invention relates to heating devices used primarily for heating the oil of motor vehicle engines, the interior of motor vehicle bodies, and railway switches; and in particular a fluid heating system wherein antifreeze is circulated with a motor driven pump through tubes and over electric heating elements whereby an independent system is provided for preheating the oil in the crankcase of a motor vehicle and which may also be used for heating the cab or body of the vehicle, or which may be used for heating parts of railroad switches to melt snow and ice away from the switch elements.

The purpose of this invention is to provide an independent heating system for motor vehicles and the like wherein antifreeze is used as the heat conveying agent so that the heat conveying means will not freeze at comparatively low temperatures.

In the conventional heating system where water is circulated through coils or other heat exchanging elements the water freezes and causes breaks in the parts when the system is inoperative. With this thought in mind this invention contemplates the use of a suitable antifreeze, such as alcohol, in a heating system with means for circulating and heating the antifreeze.

The object of this invention is, therefore, to provide means for assembling an independent heating unit whereby the fluid is heated and circulated through a coil or other heat exchanging elements without danger of the fluid freezing when the system is inoperative.

Another object of the invention is to provide an independent heating system for preheating oil in the crank case of a motor vehicle engine that operates independent of the battery and circulating pumps of the vehicle.

Another object of the invention is to provide an independent fluid heating and circulating system for motor vehicles in which the parts are permanently mounted in the vehicle.

A further object of the invention is to provide an improved heating unit using antifreeze as a heat conveying agent that may be used for preventing freezing of ice and snow on railroad switch elements.

A still further object of this invention is to provide an improved heating system using antifreeze as a heat conveying and transmitting agent which is of a comparatively simple and economical construction.

With these and other objects and advantages in view the invention embodies a heat exchanger in the form of a tube or coil with a motor driven pump for circulating fluid through the tube or coil, with electric heating means for heating the fluid as it passes through the tube or coil and with the operating elements provided with a timer and thermostat for controlling the temperature of the antifreeze.

Other features and advantages of the invention will appear from the following description taken in connection with the drawings wherein:

Figure 1 is a view showing a longitudinal section through the forward part of a motor vehicle with parts broken away and other parts omitted, and illustrating a heating coil in the crank case of the engine of the vehicle, an auxiliary heater positioned in the forward part of the vehicle and a motor driven pump and also a timer in connection with the coil circulating, and heating elements.

Figure 2 is a sectional plan taken on line 2—2 of Fig. 1 showing a coil installed in a base of a crank case of a motor vehicle engine.

Figure 3 is a diagrammatic view illustrating a typical wiring diagram for a heating system of this type.

Figure 4 illustrates a modification wherein the heating system is applied to the switch of a railroad track and in which parts of the track are broken away.

Figure 5 is a cross section through a rail showing an antifreeze tube mounted on the web thereof.

Figure 6 is a view similar to that shown in Fig. 4 illustrating a typical arrangement of the antifreeze heatng system.

Referring now to the drawings wherein like reference characters denote corresponding parts the improved heating system of this invention includes a pipe coil 10, an electric heater 11, a pump 12, a motor 13 for operating the pump, a timer 14 and an auxiliary heater 15.

With the parts arranged in this manner one end of the coil 10 is connected by a tube 16 with the discharge of the pump 12 and the opposite end of the coil is connected by a tube 17 to one end of the electric heater 11, the opposite side of the heater being connected by a tube 18 to the heater 15, and the opposite side of the heater 15 being connected by the tube 19 to the pump 12. By this means antifreeze is heated by the electric heating element in the heater 11 and circulated through the heater 15 and coil 10 whereby the oil of the engine may be preheated in cold weather to facilitate starting.

With the parts arranged in this manner the timer 14 is set so that at a predetermined period of time, before use of the vehicle is desired, the system starts operating and the oil in the crank case of the engine is heated to normal operating temperature.

With the parts arranged as illustrated in the diagram shown in Fig. 3, the timer 14 is set to close the circuit at a predetermined time whereby a circuit is completed from the battery 20, one side of which is connected to a ground 21, through a wire 22 and a wire 23, to a switch 24 which is closed, and from the switch by a wire 25, a contact arm 26, a wire 27, a thermostat 28 and a wire 29, to one side of the electric heating coil 30, the opposite end of which is connected to a ground 31. At the same time current from the wire 29 passes through a wire 32 to a motor of the pump 12, the opposite side of which is connected by wires 33 and 34 to a ground 35.

By this means antifreeze is circulated over the electric heating element 30 in the heater 11 and through the coil 10 in the crank case whereby the oil is heated until the temperature thereof reaches a predetermined degree, at which time the thermostat 28 opens, breaking the circuit to the motor driven pump and heating element.

The system is provided with a safety switch including a thermostat 36 which is normally open at low temperatures and when the temperature of the antifreeze reaches a predetermined degree the switch 36 closes completing a circuit from the battery 20 through wires 37 and 38 to a solenoid 39 of a relay which draws the contact arm 26 downwardly breaking the circuit between the wires 25 and 27. The opposite terminal of the solenoid 39 is connected to a ground by a wire 40.

As the contact 26 is drawn downwardly by the solenoid 39 a circuit is completed by wires 41 and 42 to the ignition switch of the vehicle to a vacuum switch from the intake manifold as indicated by the numeral 43 and to the starter 44, the opposite terminal of which is connected to a ground by a wire 45.

With this arrangement of the ignition and starter circuits it is impossible to start the vehicle until the temperature of the oil reaches a predetermined degree.

The heater 15 may be located at any suitable point in the vehicle body where a plurality of heaters may be used, or the tubes through which the antifreeze travels may extend around the inside of the body of the vehicle and may also extend around the rim of the windshield thereof.

In the modification illustrated in Fig. 4 the coil 10 is replaced with a continuous tube 46 that extends from a pump 47 to a heater 48 and a reservoir 49.

In this design current is supplied to the motor 50 of the pump 47 through wires 51 and 52 and the temperature is controlled by a thermostat 53. With the parts arranged in this manner the tube 46 may be extended along the frog, point, rails, as indicated by the numerals 54, or other parts of the track and with the tubes secured to the webs of the rails or other parts by clamps 55 the rails may be heated continuously, eliminating the possibility of snow, ice, and the like accumulating on the switch.

In the design illustrated in Fig. 6 a separate and independent unit is illustrated that is adapted to be used for various purposes, and in this unit the coil 56 is connected to a pump 57 which is driven by a motor 58 and the tube from the coil extends through a reservoir 59 and a heater 60.

With this arrangement current is supplied to the parts by wires 61 and 62 and a thermostat 63 is provided in the circuit for controlling the temperature of the parts heated by the antifreeze, or the like.

It will be understood that the systems of the different arrangements are each provided with a coil, heater, pump, thermostat and a reservoir or storage container and with antifreeze such as alcohol, or a suitable fluid provided in the system it may be operated to heat the oil of a motor vehicle crank case, the cab or interior of a motor vehicle body, a railway switch or part of the track and may also be used for other purposes.

It will be understood that other modifications may be made in the design and arrangements of the parts without departing from the spirit of the invention.

What is claimed is:

1. In a heating unit, the combination which comprises a coil having antifreeze therein, a pump connected to the coil for circulating the antifreeze through the coil, a heater connected to the coil for heating the antifreeze, a thermostat positioned adjacent to the coil, a timer, and a circuit connecting the timer, thermostat heater and motor of the pump to a battery to provide an independent heating system.

2. A heating unit as described in claim 1 having a storage chamber for the fluid connected to the coil.

3. A heating unit as described in claim 1 in which the coil is positioned in the crank case of a motor vehicle and in which an auxiliary heater is provided in the body of the vehicle.

MARCUS A. SPURLIN.

References Cited in the file of this patent

UNITED STATES PATENTS

| Number | Name | Date |
| --- | --- | --- |
| 1,463,510 | Jones | July 31, 1923 |
| 1,608,537 | Swanberg | Nov. 30, 1926 |
| 1,825,627 | Bowen | Sept. 29, 1931 |
| 1,861,809 | McCaleb | June 7, 1932 |
| 2,122,585 | Pollack et al. | July 5, 1938 |